United States Patent [19]
Fitzpatrick

[11] Patent Number: 5,874,138
[45] Date of Patent: Feb. 23, 1999

[54] INFLATABLE TIRE PUNCTURE PROOFING PROCESS

[76] Inventor: Peter J. Fitzpatrick, 467 Kearny Ave., Kearny, N.J. 07032

[21] Appl. No.: 584,376

[22] Filed: Jan. 11, 1996

[51] Int. Cl.$^6$ .................................................. A47C 19/22
[52] U.S. Cl. ...................... 428/35.2; 428/34.8; 428/35.3; 428/35.4; 428/69; 428/71; 81/15.6; 222/92
[58] Field of Search ................................. 428/34.8, 35.2, 428/35.3, 35.4, 69, 71, 76; 81/15.6; 222/92

[56] References Cited

U.S. PATENT DOCUMENTS

| | | | |
|---|---|---|---|
| 3,921,689 | 11/1975 | Caccia et al. | 106/33 |
| 4,064,922 | 12/1977 | Farber et al. | 106/33 |
| 4,109,695 | 8/1978 | Miyazato | 106/33 |
| 4,163,467 | 8/1979 | Dobson | 106/33 |
| 4,359,078 | 11/1982 | Egan | 106/33 |

*Primary Examiner*—Richard Weisberger
*Attorney, Agent, or Firm*—Dickinson Wright PLLC

[57] ABSTRACT

A process for making inflatable tires Puncture Proof. wherein air filled spheres or bubbles (2) are coated with a quick drying glue (10) before being inserted into a mounted, deflated tire, which is then inflated and rotated at high speed to create the centrifugal force needed to disperse spheres (2) evenly while the glue (10) dries and also to balance the wheel (8) without the use of weights.

4 Claims, 3 Drawing Sheets

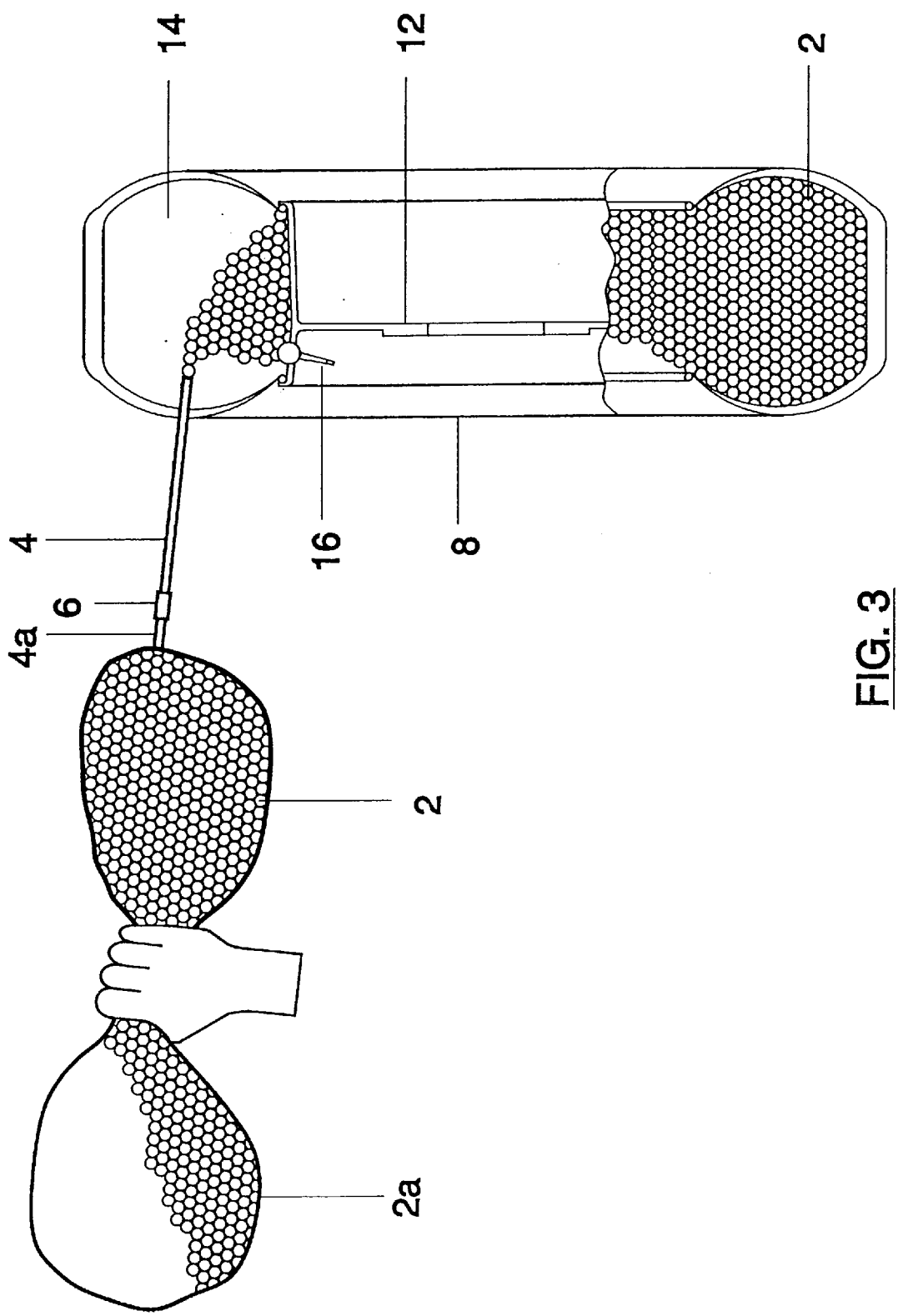

INFLATABLE TIRE PUNCTURE PROOFING PROCESS

FIELD OF INVENTION

This Invention relates to tires of all sizes, more specifically to tires which are inflated and of the type used on trucks, bicycles and all types for heavy equipment, buses, planes, etc.

DESCRIPTION OF PRIOR ART

The purpose of this invention is to provide a unique device for Puncture Proofing the tires of a vehicle which uses inflatable tires, such as cars, trucks, buses, all types of bicycles, aircraft tractor-trailers, earth moving equipment, and the like.

Heretofore, methods for puncture proofing inflatable tires of cars, trucks, bicycles, heavy equipment, buses, planes and the like have consisted of the placement of an insert or liner inside of the tire, as can be seen in U.S. Pat. Nos.: 4,359,078 Egan, 4,163,467. Dobson. 4,064,922.Farber, Loveless and Peterson. 3,921,689.Caccia and Benatti. and 4,109,695. Miyazato.

While the aforementioned 'inserts' appear to be designed primarily for use in newly manufactured tires, "The Object" of this invention is to fill the need for a Puncture Proofing Kit which can be used by the Public at low cost and which will add life to the tires now in use and unlike the aforementioned tires, the product of this invention will make any tire Knife 'slash' proof and bullet proof even to the point where 'holes' may be drilled from one side through the other side without having any adverse effect.

SUMMARY OF THE INVENTION

Tires of every description, at one time or another, and for many reasons go flat or blowout sometimes causing major accidents and serious injuries but mostly causing unpleasent situations where the driver has to ruin the tire just to get to a safe place where he or she faces the unpleasant prospect of changing the damaged tire, provided its not raining or snowing and providing a spare and a jacks are available.

Plane tires warrent special consideration because so many lives depend on them every landing and take off is a cause for concern for owners, crew and passengers alike.

The present invention comprehends a puncture proofing system which accomplishes and fulfills a number of worthwhile objectives, including general universal application to different types of tires, inexpensive cost of manufacture, and quick and easy installation.

In addition to the above, the structure of the present invention achieves the objective of providing a unique type of insulation when produced in cake or slab form of varying thickness and cut, to fit between wall or ceiling Joists because of its light weight or the system could be applied to wall cavities or hollow areas such as the hull of a boat, to help prevent sinking etc. when applied in the same manner as its application to tires, or it could be used in a ship's furniture to double as rafts, etc.

A still further and equally important objective which is accomplished by the present invention is its use as a fire fighting apparatus. When said bubbles are filled with fire retardant chemicals and formed as a ceiling tile or panel and the viewable side of the panel is decorated with a very thin layer of membrane which allows maximum heat penetration to burst said bubbles and allow said heat retarding chemicals to rain down on, and extinguish the fire below and possibly preventing water damage to the building which sometimes cause more damage than the fire, especially to the floors directly below where the water was focused.

BRIEF DESCRIPTION OF THE DRAWINGS

FIG. 3 is a cross sectional view of the Tire of FIG. 2 being filled with Spheres (2) or bubbles.

DETAILED DESCRIPTION OF THE INVENTION

Figure 1:
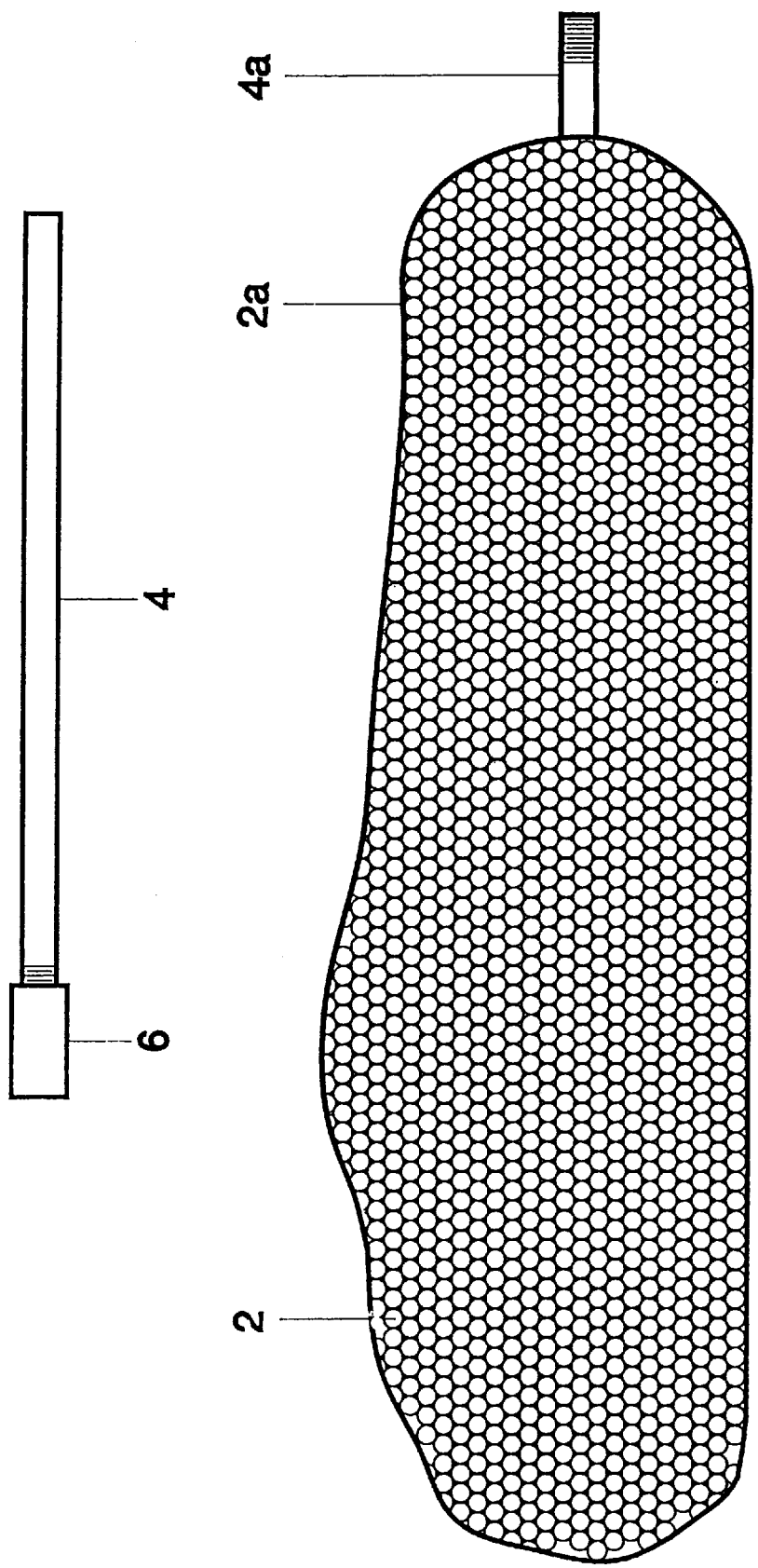
FIG. 1 is a perspective view of the primary components of the Invention showing 'Spheres' or Bubbles (2) in the sack or Container (2A) attached to which is its Nipple (4) and the Nipple Extension (4A) and Nipple Coupling (6) which conveys the spheres or bubbles and deposits them inside the tire to be filled.

With reference to FIG. 1, the primary component of the system is shown as a sphere or bubble (2) constructed of a very thin membrane of plastic or rubber, whose wall thickness should be similar to that of a childs toy balloon and should have an outside diameter of about one quarter of an inch (about 6 mm) in order to facilitate its movement trough a transfer nipple (4).

Figure 2:
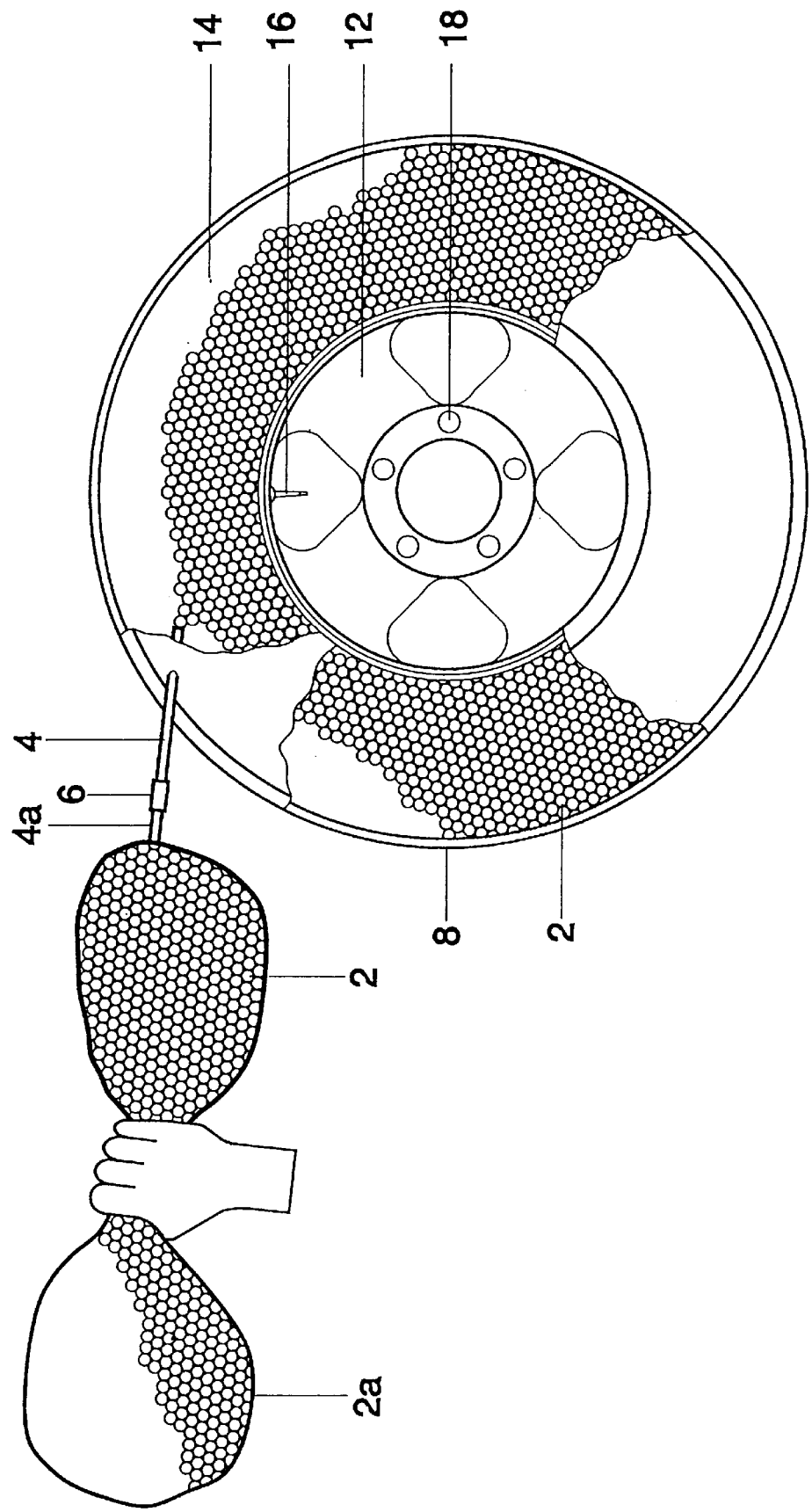
FIG. 2 is a perspective view of car tire being filled with Spheres or Bubbles (2) with cut-aways showing the spheres inside of the tire and a small amount of residual glueing agent (10) in the sack or Container (2A). Also shown are the Transfer Nipple (4), The Transfer Nipple Extension (4A) The Transfer Nipple Coupling (6) penetrating the side wall of a Tire (8) The Tire Rim (12), the interior of the Tire (14),the Non Return Air Valve (16) and the hole for the Lugs (18).

Spheres (2) which are intended for use in tires (B) should only contain air and be durable enough to withstand pressing together of both sides with thumb and forefinger, without bursting again to facilitate its movement through a transfer nipple (4) since said sphere or bubble (2) may have to elongate while traveling through said transfer nipple (4). FIG. 2.

A measured amount of said bubbles (2), depending on the volume of the tire (8) to be filled, is bathed in a quick drying liquid gluing agent (10) of a heat resistant type. After the bubbles (2) have been immersed, the residual glue is drained. The bubbles (2) are then forced from their container through the nipple (4). Preferably the nipple is attached to the valve core after the non-return air valve has been removed and the air in the tire exhausted. Said nipple (4), or an extension thereof, is connected to said car tire's air nipple while said car tire's nipple is at its rotative highest point to allow said bubbles (2) to fall inside of the tire (8) and fill the void between the wheels rim and the inside of said tire (8) (said tire (8) must be mounted on its rim (12)). When said car tire (8) is filled with bubbles (2) its 'non-return air valve' is replaced and said tire (8) is inflated to its proper air pressure after which the wheel should be rotated at two to three hundred RPMs for the length of time that it takes said glue (10) to dry. This can be done while the car is on a garage hydraulic lift. The high speed rotation will create a centrifugal force which will disperse said bubbles (2) evenly and away from said rim (12) and allow said bubbles (2) to adhere to the inside of said tire (8) and to each other to create an inner tube consisting of a mass of separate air cells all clued together.

Said tire (8) is now puncture proof and cannot go flat or blowout, even if holes were drilled through it or if it were ice picked etc. Said tire (8) when worn out, can be changed in the usual manner since the aforementioned centrifugal force allowed said bubbles (2) to adhere to the inside of said tire (8) and to each other but not to said wheel's rim (12). Said centrifugal force will also balance said wheel without the use of weights, which sometimes fall off, leaving a wheel unbalanced and contributing to the wear and tear of the vehicle. Said bubbles (2) could also be inserted by air pressure.

Another object of this Invention is the use of said spheres or bubbles (2) as a unique type of insulation. When glued together and formed into a cake or slab and cut into varying thickness or any desired shape or size, it can he used as a very effective type of insulation in walls or ceilings or any empty space.

The insulation of this invention can also be used as a mattress with or without springs or as couch padding and cushions, which could double as floats in a swimming pool or as life rafts when used as cushions on the furniture of a ship or boat.

Said spheres (2) could be made larger, about 1" diameter for very large tires such as heavy construction equipment or large planes or the like.

Spheres (2) of the larger variety could he filled with fire fighting or fire retarding chemicals and when coated with said gluing agent (10) could be configured to ceiling tiles and when in place the viewable side could he disguised by decorating with a very thin membrane which allows maximum heat penetration in order to allow said spheres (10) to burst at a known temperature allowing said fire retarding chemicals to rain down on the source of, and extinguish the fire, and prevent water damage to that floor and any floors directly beneath.

Said spheres (2) when coated with said glue (10) and pressed together in a cake or slab form will acquire a number of sides which will render them 'multi-sided' spheres or bubbles and as such will become a unique spacing packing or padding material ideal for use as spacing material between electrical circuitry and the like or as packing material for delicate instruments and the like or as padding material for shoe or boot inner soles or injury splints or even as insulation sewn into clothing for extreme cold plus numerous other objects and advantages.

Thus it will be seen that the inflatable time Puncture Proofing Process of the invention provides a highly reliable, lightweight, yet economical means for Puncture Proofing inflatable tires of any size, by persons of almost any age.

While the foregoing description contains many details these should not be construed as limitations on the scope of this invention, but rather as an exemplification of some preferred embodiments thereof. Many other variations are possible.

Accordingly, the scope of the invention should be determined not by the embodiment illustrated, but by the appended claims and their legal equivalents.

I claim:

1. Apparatus for repairing a pneumatic tire comprising a container, a plurality of small flexible elements in said container, and means for injecting said plurality of small, flexible elements filled with gas into a said pneumatic tire.

2. Apparatus according to claim 1 wherein container further comprises uncured glue capable of curing when exposed to air in a said tire.

3. Apparatus according to claim 2 wherein each of said flexible elements comprises a thin rubber shell filled with gas.

4. Apparatus according to claim 3 wherein each of said small flexible elements is spherical and has a diameter of about 6 mm.

* * * * *